(12) United States Patent
Hardy et al.

(10) Patent No.: US 6,283,160 B1
(45) Date of Patent: Sep. 4, 2001

(54) FLEXIBLE PIPE WITH WINDINGS OF INSULATING STRIP AND SPIRALLING MACHINE INTENDED FOR MANUFACTURING IT

(75) Inventors: Jean Hardy, Barentin; René Antoine Maloberti, Champigny sur Marne, both of (FR)

(73) Assignee: Coflexip (FR)

( * ) Notice: Subject to any disclaimer, the term of this patent is extended or adjusted under 35 U.S.C. 154(b) by 0 days.

(21) Appl. No.: 09/443,246

(22) Filed: Nov. 18, 1999

(30) Foreign Application Priority Data

Apr. 30, 1999 (FR) .................................................. 99 05509

(51) Int. Cl.<sup>7</sup> ...................................................... F16L 9/14
(52) U.S. Cl. ............................ 138/129; 138/149; 138/148
(58) Field of Search ..................................... 138/149, 148, 138/129, 140, 141, 122

(56) References Cited

U.S. PATENT DOCUMENTS 4,921,018 * 5/1990 Dridi et al. ....................... 138/148 X

FOREIGN PATENT DOCUMENTS

| 2207924 | * | 8/1973 | (DE) . | |
|---|---|---|---|---|
| 0400689 | | 6/1996 | (EP) . | |
| 2641492 | * | 1/1989 | (FR) | ...................................... 138/129 |
| 5187594 | * | 7/1993 | (JP) | ...................................... 138/149 |

OTHER PUBLICATIONS

PCT Application WO 94/19639 Myerscough, Martin Pub date Sep. 1, 1994.*

EP 400689 Hamadi Dridi, Apr. 25, 1985.*

* cited by examiner

*Primary Examiner*—Patrick Brinson
(74) *Attorney, Agent, or Firm*—Ostrolenk, Faber, Gerb & Soffen, LLP

(57) ABSTRACT

A lagged flexible tubular pipe for conveying fluids, produced by helically winding at least one strip made of thermal insulation around a flexible central core at a uniform pitch and with a gap. Jointly winding gap-free an intermediate extruded section into the gap between the turns of strip and sealing the gap. The intermediate section is made of a material which volume wise is nearly incompressible.

12 Claims, 2 Drawing Sheets

FLEXIBLE PIPE WITH WINDINGS OF INSULATING STRIP AND SPIRALLING MACHINE INTENDED FOR MANUFACTURING IT

BACKGROUND OF THE INVENTION

The present invention relates to a lagged flexible pipe for conveying a fluid such as a gas, crude oil, water or other fluids over long distances. The invention is quite particularly aimed at such a pipe intended for offshore oil production.

EP 0,400,689, in the name of the assignee company, for example, discloses a flexible pipe of this type, produced by helically winding at least one strip of insulation around a flexible central core. Each strip is formed of an extruded section of the insulation, and in practice, a sufficient number of layers of strip is laid in order to obtain the required insulation. An outer sealing sheath surrounds the thermal insulation.

The strip is laid at an angle of close to 90° with respect to the axis of the pipe, and a space between the turns, also known as a gap, is needed so that the pipe can be wound to its minimum radius of curvature without increasing its stiffness in bending. The size of the gap between the turns is typically about 10% of the width of insulating strip. If there is no gap, the insulating layer would behave like a continuous sheath of the material used to manufacture the said strip, and this would considerably increase the stiffness: thus, while the stiffness of a pipe with a lagging winding with a 10% gap is, in a particular example, 9.4 kN/m$^2$, the stiffness of the same pipe made with continuous winding of the same insulation would rise to 26 kN/m$^2$.

Industrially, the materials used for this type of application need to exhibit an optimum combination of thermal and mechanical properties. Thus, for example, a low coefficient of thermal conductivity (lambda) and a compression strength compatible with the hydrostatic pressure generated by the head of water in which the pipe is laid are combined. Typically, good materials have a lambda value of the order of at most 0.15 W/m.K, a compressive stress between plates in excess of 10 MPa at 90° C., a modulus in tension in excess of 600 MPa at 23° C., and an elongation at the threshold of plastic deformation in excess of 7% at 23° C.

Although the above pipe is generally satisfactory, it has been found that the gap needed between the turns of the insulating strip gave rise to two kinds of problems. On the one hand, when the outer sealing sheath becomes torn, sea water can enter the free volume formed by the gap and thus increase the lambda value. On the other hand, the combination of the hydrostatic pressure and of the temperature when the pipe is in service may cause the material of the insulating strip to creep into the gap between turns, and this results in an increase in the apparent modulus of the layer considered, an increase in the bending stiffness of the pipe, and a reduction in the thickness of the insulating layer, leading to a drop in the thermal-insulation performance of the flexible structure.

A solution which would consist in winding without a gap an extruded section which combines all the thermal and mechanical requirements (mainly, typically: a lambda value of the order of at most 0.15 W/m.K, a compressive stress between plates in excess of 10 MPa at 90° C., a modulus in tension of below 100 MPa at 23° C., and an elongation at the threshold of plastic deformation in excess of 7% at 23° C., is not possible as, to the applicant's knowledge, no extrudable material which exhibits these properties yet exists.

SUMMARY OF THE INVENTION

The object of the invention is to propose an insulated flexible pipe which does not exhibit the aforementioned drawbacks.

The invention achieves its objective by virtue of a lagged flexible pipe for conveying fluids, produced by helically winding, at a uniform pitch and with a gap, at least one strip made of thermal insulation around a flexible central core, and by the joint and gap-free winding of an intermediate section into the gap between the turns of strip. The intermediate section is made of a material which volume wise is more or less incompressible. Thus, the intermediate section prevents the creep and potential filling of the gaps between the turns with sea water while at the same time allowing the bending which causes the system to operate at constant volume. The insulating strip typically has the conventional gap and physical properties of the known strip. The intermediate section may be wound at the same time as the winding of the thermally-insulating strip, or separately.

Extrudable sections which are, in terms of volume, incompressible, may in particular be obtained from elastomers or polymers containing elastomer blocks or sequences. These may, in particular, be hydrocarbon elastomers, silicone elastomers or thermoplastics of the polyester or polyether type with elastomer sequences, the latter being preferred on account of its resistance to sea water.

Advantageously, unidirectional strengtheners are built into the intermediate section so that tensile load can be applied without giving rise to a significant reduction in the cross section of the section while it is being wound onto the said central core.

The elastomers have an elastic property which is put to good use during laying. The intermediate section actually advantageously has a trapezoidal cross section and is laid in such a way that the long base is deformed elastically and presses on the sides in such a way as to anchor the section, preventing disengagement and thus providing sealing between the turns. However, other shapes of section are possible.

Liquid-filled cavities may be incorporated into the intermediate section.

The material of the intermediate section advantageously has a lambda value of 0.22 W/m.K, which does not excessively reduce the overall lambda value of the layer of lagging.

Thus, by virtue of the invention, it is possible to obtain a lagged flexible pipe the lambda value of which is not degraded, in which the bending stiffness of the flexible pipe down to the minimum bend radius is not increased, in which the sealing of the insulating layer is guaranteed in the event of the tearing of the outer sheath, and the thickness of the insulating layer of which is guaranteed.

The invention also relates to a spiraling machine specially intended to wind, onto a lagged flexible pipe of the aforementioned type, an intermediate extruded section according to the invention into the gap. The spiraling machine comprises means which can rotate around the core of the pipe, and includes a trough for conveying the section to the lay point, this trough being transversely arched in such a way as to insert the section under elastic deformation, as has been explained.

BRIEF DESCRIPTION OF THE DRAWINGS

Other advantages and features will be brought to light on reading the description which follows, with reference to the diagrammatic appended drawings, in which.

DESCRIPTION OF PREFERRED EMBODIMENTS

Figure 1:
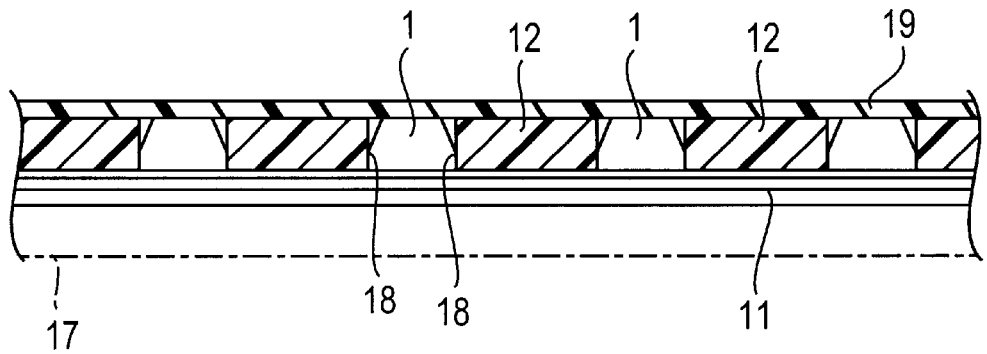
FIG. 1 is a part view in longitudinal section of a lagged pipe according to the invention.
Figure 2:
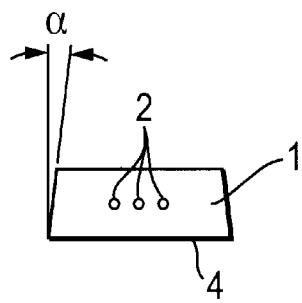
FIG. 2 is a view in transverse section of a first embodiment of the intermediate extruded section according to the invention.

FIG. 1 diagrammatically shows a pipe produced by helically winding, at a uniform pitch and with a gap, a strip 12 of thermal insulation around a flexible central core 11 being on axis 17. The gap is filled by the co-winding of the intermediate section 1 in accordance with the invention, the assembly is covered with a sealing sheath 19. To make laying the section in the gap with elastic deformation (as shown in an exaggerated fashion at 18 in FIG. 1) easier, this intermediate section 1 preferably has a trapezoidal cross section, as shown in FIGS. 1 to 4. The inclination of the lateral faces of the section make an angle α of between, for example, 2 and 10°, for example, 5°, with the vertical. The width of the lower face 4 corresponding to the long base of the section is slightly greater (for example by one tenth of an mm) than the width of the space between turns or gap (which measures, for example, some fifteen mm) of the insulating strip that it is to fill. Bearing in mind the possible creepage over time of the material of the intermediate section and the weakening of its elastic properties, this initial deformation of the section may, after a certain length of time, no longer be appreciable.

One or more unidirectional strengtheners 2 such as fibreglass, Kevlar® or similar rovings are built into the elastomeric material of which the section 1 is made.

Figure 3:
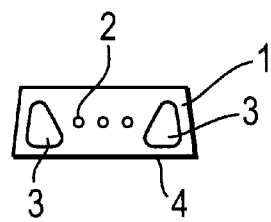
FIG. 3 is a view in cross section of a second embodiment of the intermediate extruded section according to the invention.
Figure 4:
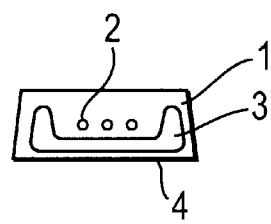
FIG. 4 is a view in cross section of a third embodiment of the intermediate extruded section according to the invention.

Fluid-filled longitudinal cavities 3 may be provided, as illustrated in FIGS. 3 and 4.

Figure 5:
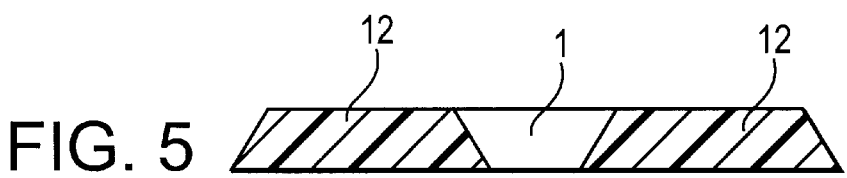
FIGS. 5 and 6 illustrate, in cross section, two alternative forms of the lagging strip and of the intermediate section.
Figure 6:
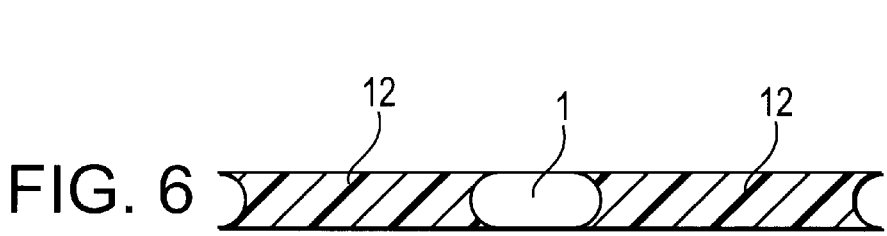

FIGS. 5 and 6 show that the invention is also applicable to instances in which the strip 12 is not of rectangular cross section but may, for example, be trapezoidal, or have concave edges, the section 1 being roughly complementary.

Figure 7:
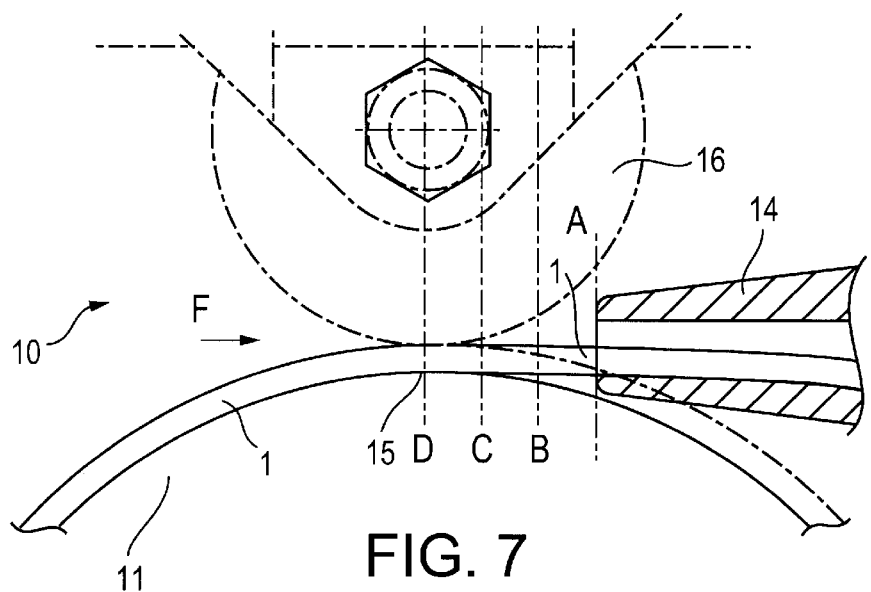
FIG. 7 is a view in partial cross section transversely to the axis of the flexible pipe, of the winding machine in the vicinity of the lay point.
Figure 8:
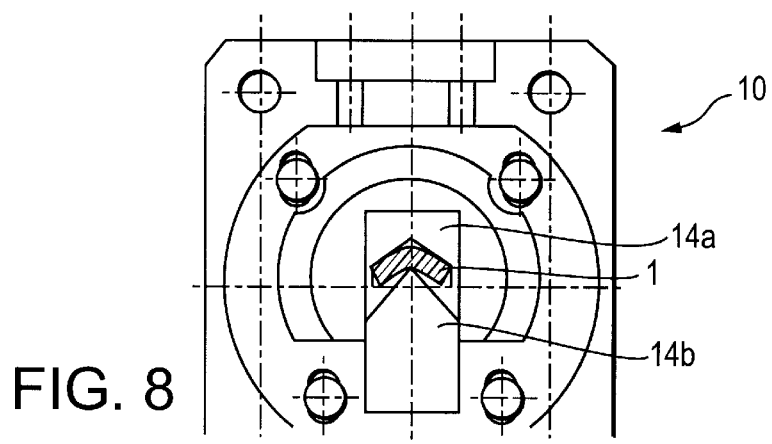
FIG. 8 is a view in the direction F of the trough of the winding machine of FIG. 7.
Figure 9A:
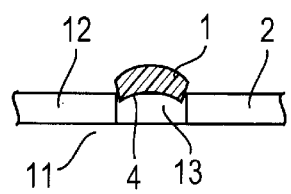
FIG. 9 shows four stages A–D in the laying of the intermediate extruded section in four parallel planes of the machine of FIG. 7.
Figure 9C:
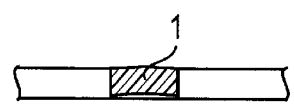
Figure 9B:
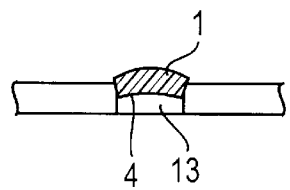
Figure 9D:
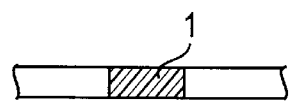

FIGS. 7 to 9 show the principle of laying the intermediate section 1. Laying is performed in a winding machine depicted diagrammatically in FIGS. 7 and 8 at machine 10 and comprising the core 11 of the flexible pipe on which the turns of the insulating strip 12 have been laid, two successive turns of the strip leaving between them a gap 13 which the intermediate section 1 is to fill.

The winding machine 10 comprises means (such as an annular plate) rotating about the core 11. These means support a trough 14 for conveying the section 1 to the lay point 15. The trough 14 comprises two section pieces 14a and 14b which are transversely arched so as to give the section 1 conveyed between them a curvature which allows the lower face 4 of the section 1 to be inserted into the gap 13, as shown in the section 9A taken at the exit of the trough. The subsequent sections 9B, 9C and 9D (more or less at the lay point) show the progressive forcible insertion of the section 1, assisted in this by the roller 16, into the gap 13 until it is completely filled.

The invention has been described with reference to a short-pitch winding. It may, however, be applied to a long-pitch winding, or even to a so-called S-Z winding in which the direction of winding changes periodically.

What is claimed is:

1. A method of forming flexible pipe for conveying fluids, comprising the steps of:

helically winding at least one strip made of a thermal insulation around a flexible central core at a uniform pitch and with a continuous helical gap between adjacent turns of the strip;

extruding an intermediate extruded section of a material which volumewise is mostly incompressible;

winding the intermediate section at the same time as the strip is wound and without any gap between the strip and the intermediate section into the gap between the turns of the strip.

2. A flexible pipe for conveying fluids, comprising:

at least one strip made of a thermal insulation helically wound around a flexible central core at a uniform pitch and with a continuous helical gap between adjacent turns of the strip;

an intermediate extruded section of a material which volumewise is mostly incompressible;

the intermediate section being wound at the same time as the strip is wound and without any gap between the strip and the intermediate section into the gap between the turns of the strip.

3. The pipe as claimed in claim 2, wherein the intermediate section is comprised of elastomers of polymers containing elastomer blocks or sequences.

4. The pipe as claimed in claim 3, wherein the intermediate section is comprised of hydrocarbon elastomer, silicone elastomer or thermoplastic of the polyester of polyether type with elastomer sequences.

5. A flexible pipe for conveying fluids, comprising:

at least one strip made of a thermal insulation helically wound around a flexible central core at a uniform pitch and with a gap between adjacent turns of the strip;

an intermediate extruded section of a material which volumewise is mostly incompressible;

the intermediate section being wound at the same time as the strip is wound and without any gap between the strip and the intermediate section into the gap between the turns of the strip;

further comprising unidirectional strengtheners built into the intermediate section.

6. A flexible pipe for conveying fluids, comprising:

at least one strip made of a thermal insulation helically wound around a flexible central core at a uniform pitch and with a gap between adjacent turns of the strip;

an intermediate extruded section of a material which volumewise is mostly incompressible;

the intermediate section being wound at the same time as the strip is wound and without any gap between the strip and the intermediate section into the gap between the turns of the strip;

wherein the intermediate section has a trapezoidal cross section as the strip is wound including a long base of a width greater than the width of the gap.

7. The pipe as claimed in claim 6, wherein at least the long base of the section is subjected to elastic deformation in the laid state in the gap.

8. The pipe as claimed in claim 3, further comprising liquid-filled cavities incorporated into the intermediate section.

9. A flexible pipe for conveying fluids, comprising:
- at least one strip made of a thermal insulation helically wound around a flexible central core at a uniform pitch and with a gap between adjacent turns of the strip,
- an intermediate extruded section of a material which volumewise is mostly incompressible;
- the intermediate section being wound at the same time as the strip is wound and without any gap between the strip and the intermediate section into the gap between the turns of the strip;
- wherein the thermal insulation material of the strip has the following properties: a coefficient of thermal conductivity of the order of at most 0.15 W/m.K, a compressive stress between plates in excess of 10 MPa at 90° C., a modulus in tension in excess of 600 MPa at 23° C., and an elongation at the threshold of plastic deformation in excess of 7% at 23° C.

10. A flexible pipe for conveying fluids, comprising:
- at least one strip made of a thermal insulation helically wound around a flexible central core at a uniform pitch and with a gap between adjacent turns of the strip;
- an intermediate extruded section of a material which volumewise is mostly incompressible;
- the intermediate section being wound at the same time as the strip is wound and without any gap between the strip and the intermediate section into the gap between the turns of the strip,
- wherein the gap between the turns of the strip is of the order of 10% of the width of the strip.

11. A lagged flexible pipe for conveying fluids comprising:
- a flexible central core;
- a helical winding of at least one strip of a thermal insulation wound around the core, wherein turns of the winding have a uniform pitch and with a continuous helical gap between the turns of the winding, with the gap having a width,
- an intermediate extruded section of a material which is volumewise mostly incompressible disposed in the gap between the turns of the winding and the intermediate section being of a width to fill the gap.

12. A lagged flexible pipe for conveying fluids comprising:
- a flexible central core;
- a helical winding of at least one strip of a thermal insulation wound around the core, wherein turns of the winding have a uniform pitch and with a gap between the turns of the winding, with the gap having a width;
- an intermediate extruded section of a material which is volumewise mostly incompressible disposed in the gap between the turns of the winding and the intermediate section being of a width to fill the gap, further comprising liquid-filled cavities incorporated into the intermediate section.

* * * * *